United States Patent [19]

Fluder et al.

[11] 4,043,143
[45] Aug. 23, 1977

[54] LOCOMOTIVE ENVIRONMENTAL SYSTEM

[75] Inventors: Chester Henry Fluder, Wheeling; Nick J. Yohanna, Chicago, both of Ill.

[73] Assignee: Vapor Corporation, Chicago, Ill.

[21] Appl. No.: 719,200

[22] Filed: Aug. 31, 1976

[51] Int. Cl.² .............................................. B60H 3/04
[52] U.S. Cl. ......................................... 62/243; 62/244
[58] Field of Search ................................... 62/243, 244

[56] References Cited

U.S. PATENT DOCUMENTS

| 3,848,428 | 11/1974 | Rieter, Jr. | 62/244 |
| 3,885,398 | 5/1975 | Dawkins | 62/243 |
| 3,983,715 | 10/1976 | Hair, Jr. et al. | 62/243 |

Primary Examiner—Lloyd L. King
Attorney, Agent, or Firm—Francis J. Lidd

[57] ABSTRACT

Locomotive environmental system to be mounted in the roof of a cab for controlling the environment within the cab which includes a housing having an upper chamber arranged above the roof line of the cab and having one compartment for a condenser unit and another compartment for a compressor unit, a blower in the compartment housing the condenser unit for circulatng air through the condenser compartment and also through the compartment housing the compresser unit, a lower chamber arranged below the roof line of the cab and housing an evaporator unit for the system together with blower means for circulating air through the lower chamber and the cab, wherein the motors for the compressor unit and the blower associated with the condenser unit are driven by the same source of variable power.

7 Claims, 10 Drawing Figures

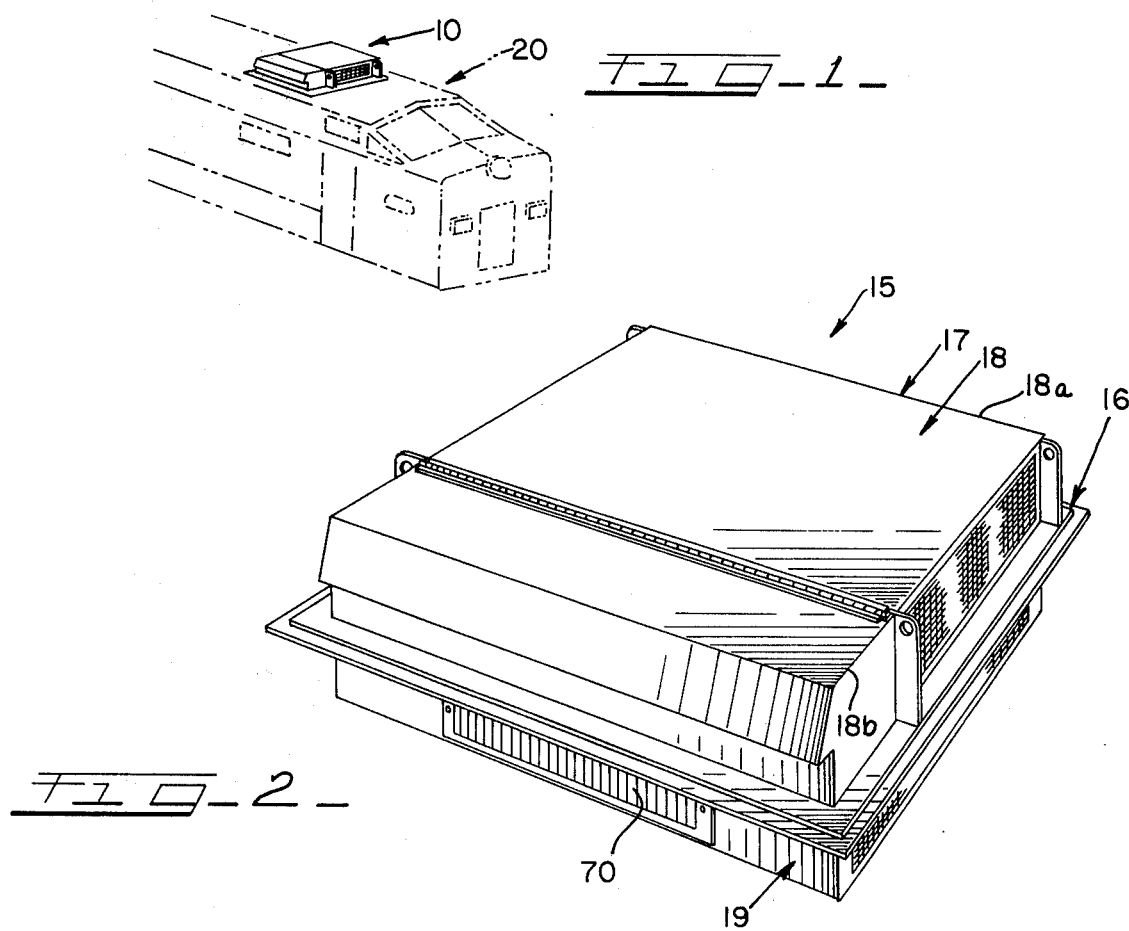
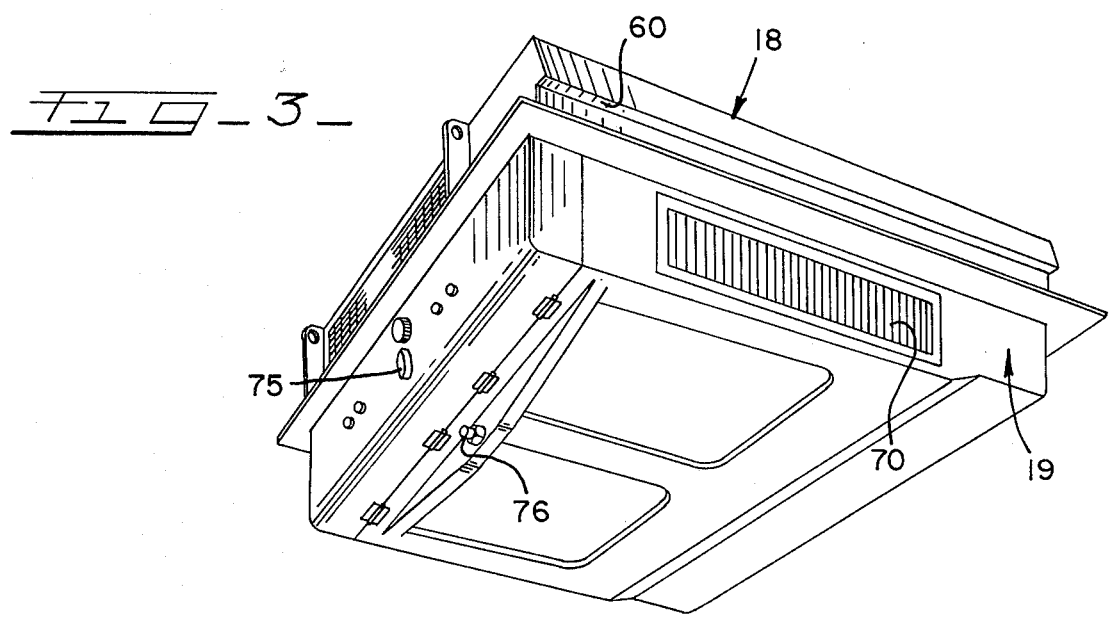

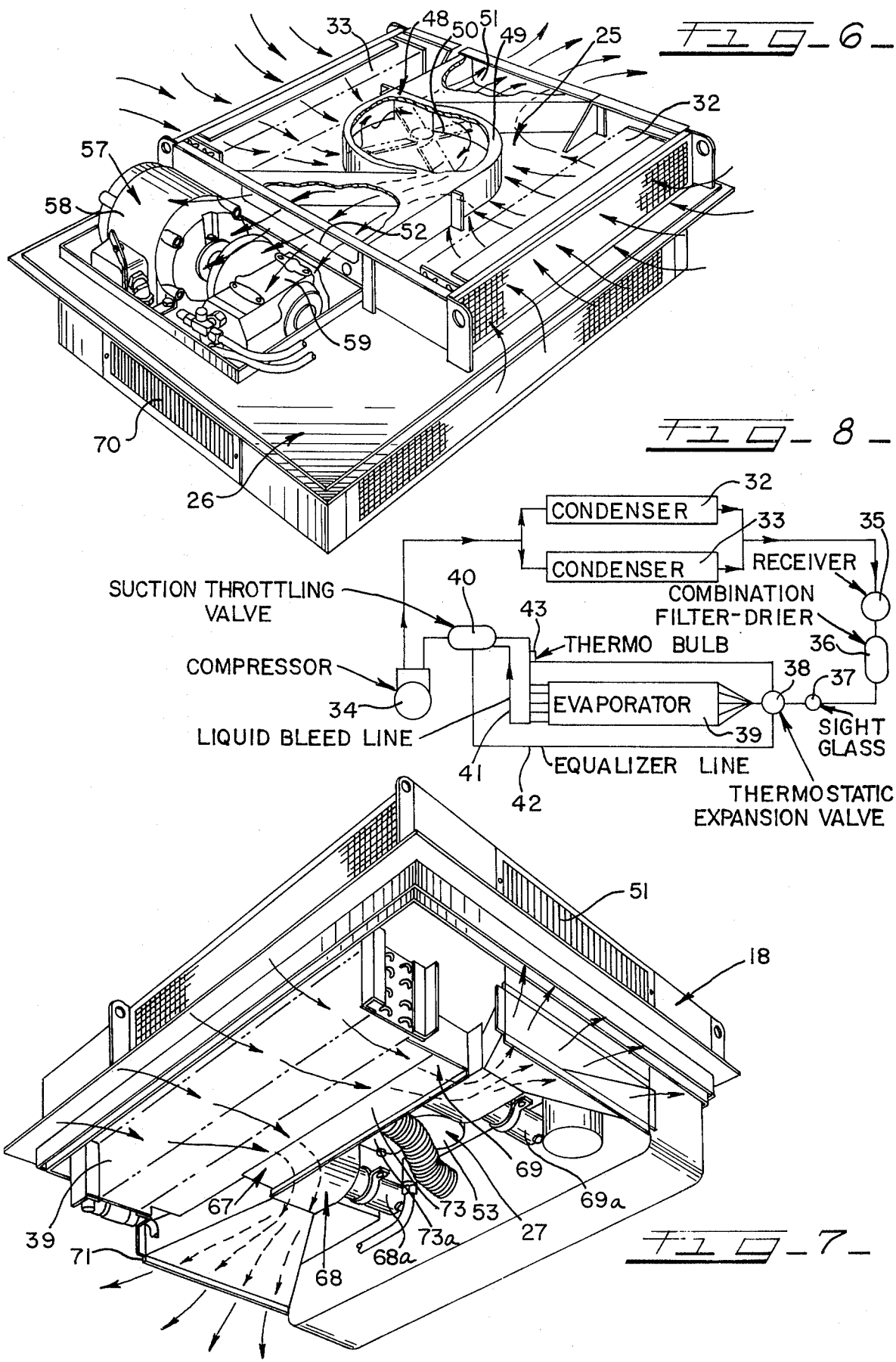

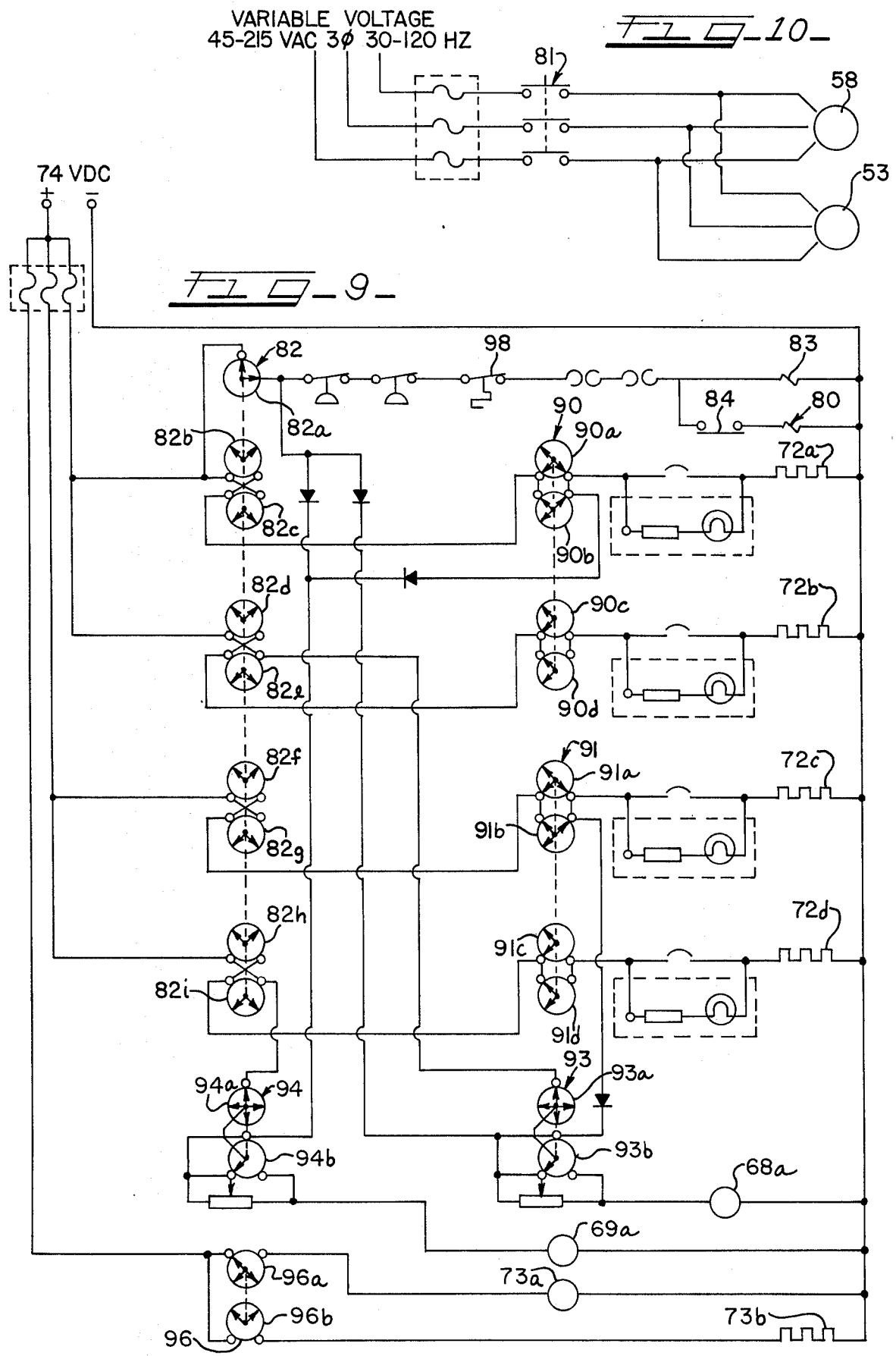

LOCOMOTIVE ENVIRONMENTAL SYSTEM

This invention relates in general to an environmental system for the cab of a heavy vehicle such as a locomotive to provide a desired environment in all weather conditions, and more particularly to an air conditioning system that mounts in the roof of a locomotive cab and provides cooled or heated air within the cab to a controlled temperature.

Heretofore, air conditioning systems have been known to condition the air within the cab of a locomotive, such as shown in U.S. Pat. No. 3,848,428. However, such systems, when set for cooling operation, have encountered component overheating problems. The particular system disclosed in the aforementioned patent utilizes direct current driven condenser and compressor motors which not only at times experience overheating but also contribute to icing of the refrigeration unit which directly reduces the overall efficiency of the system.

It is therefore a primary object of the present invention to provide an air conditioning system for a locomotive cab that overcomes the problems heretofore encountered by overcoming motor overheating situations and refrigeration unit icing situations.

It is a further object of the present invention to provide an air conditioning system for a locomotive cab having an extremely compact structure to establish a low profile unit on the roof of a locomotive cab and where component cooling is achieved to prevent overheating problems.

The air conditioning system of the present invention is mountable in the roof of a locomotive cab and includes side-by-side condenser and compressor compartments positioned above the roof line and an evaporator compartment positioned below the roof line. Parallel connected dual condensers are arranged in the condenser compartment together with a condenser blower unit which pulls air in from the atmosphere across the condensers and expels the air partially to the atmosphere and partially into the compressor compartment for cooling the compressor unit. Accordingly, overheating of the compressor motor of the compressor unit is avoided. The air entering the compressor compartment is then expelled to the atmosphere.

To further achieve the objective of preventing overheating of the compressor motor as well as the motor for the condenser blower, the motors are of the variable speed induction type and are electrically connected in parallel to be driven by the same source of variable alternating current power. This power is taken directly from the alternating current generator or alternator of the locomotive, and therefore since this generator has a variable output depending upon the speed of the locomotive, the power delivered to the compressor motor and the condensor blower motor is likewise variable over the speed range of the locomotive.

Heated air is provided by the air conditioning system by utilizing electric heating elements mounted in the evaporator unit chamber. Further, a defroster unit is mounted in the evaporator unit compartment for controlling the environment at the windows of the locomotive.

It is therefore a further object of this invention to provide an air conditioning system for a locomotive cab which gives all-weather performance efficiently from a compact unit.

A still further object of this invention is in the provision of an air conditioning system where the motor driving the compressor and the motor driving the condenser blower are electrically powered from the same source, and further where the motors are of the variable speed induction type and the source comes directly from the alternating current generator of the locomotive.

Other objects, features and advantages of the invention will be apparent from the following detailed disclosure, taken in conjunction with the accompanying sheets of drawings, wherein like reference numerals refer to like parts, in which:

FIG. 1 is a somewhat diagrammatic perspective phantom view of a part of a locomotive having an air conditioning system mounted thereon according to the invention;

FIG. 2 is a top perspective view of the air conditioning unit of the present invention;

FIG. 3 is a bottom perspective view of the air conditioning unit shown in FIG. 2;

FIG. 6 is a view similar to FIG. 4 but showing the air flow patterns and some parts broken away to show underlying parts;

FIG. 7 is a view similar to FIG. 5 but showing the air flow patterns;

FIG. 8 is a schematic diagram of the refrigeration unit utilized in the air conditioning system of the present invention;

FIG. 9 is an electrical schematic diagram for the air conditioning system of the invention; and FIG. 10 is an electrical schematic diagram for the compressor and condenser motors utilized in the air conditioning system of the invention.

The air conditioning system of the present invention is illustrated and primarily described in connection with a locomotive for the purpose of providing all-weather temperature control within the cab of the locomotive for the operator thereof. However, it should be appreciated that the air conditioning system of the invention could be readily utilized for other heavy vehicles where it would be practical to mount the system in the roof of the vehicle. It could be used for conditioning the air within any other railway vehicle if so desired. It is principally useful in connection with railroad equipment and particularly a locomotive, inasmuch as the compressor and condenser motors of the refrigeration unit are to be driven by an alternating current generator having variable output. In this connection it should be appreciated that locomotives generally have their wheels driven by traction motors of the induction type where the power for the traction motors is derived from an alternating current generator. The speed of the traction motors is increased or decreased by an increase or decrease of the power output from the generator. By driving the compressor and condenser motors of the air conditioning unit of the present invention directly from the generator, overheating problems of these motors and icing problems of the refrigeration unit heretofore encountered are avoided. Accordingly, a more efficient air conditioning system than heretofore known is achieved by the present invention.

Figure 4:
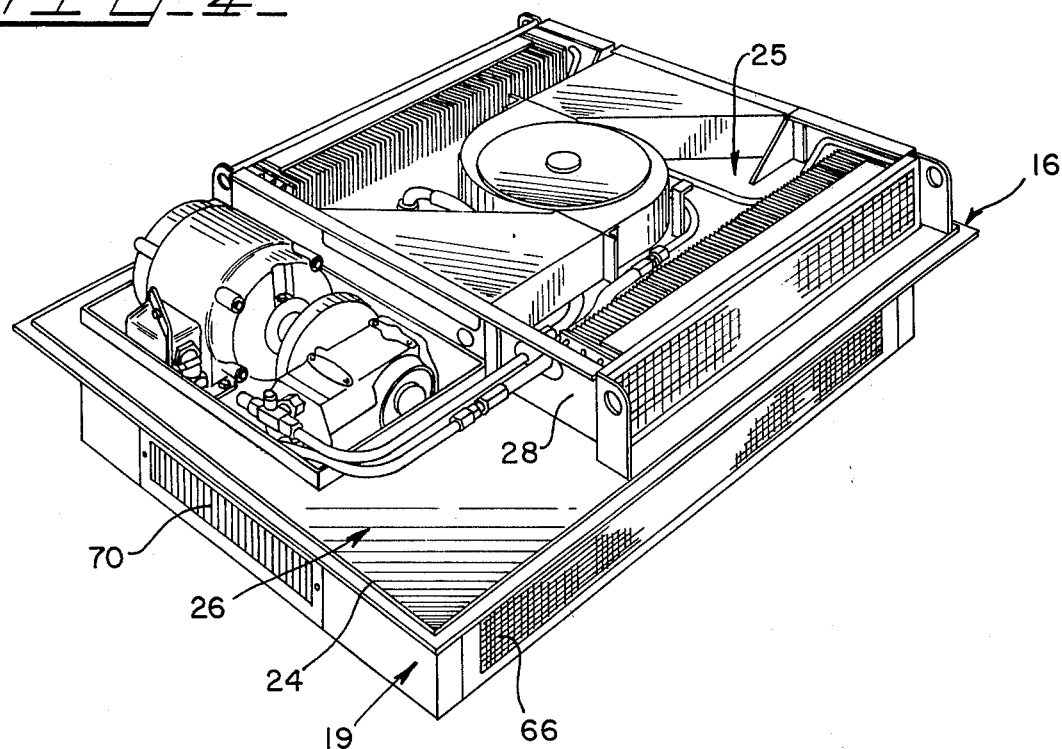
FIG. 4 is a top perspective view like FIG. 2 but with the cover removed to show underlying parts.

Referring now to the drawings and particularly to FIGS. 2 to 4, the air conditioning unit of the present invention, generally indicated by the numeral 15, includes a frame 16 having a housing 17 thereon, which includes an upper cover 18 and a lower cover 19 as shown in mounted relation on a locomotive 20 in FIG. 1. The unit is so mounted on the locomotive at the cab, particularly for conditioning the air within the cab such that the frame 16 generally aligns with the roof line of the locomotive, while the upper cover 18 projects generally above the roof line and the lower cover 19 projects generally below the roof line within the cab. Accordingly, the upper cover is fully exposed to the atmosphere.

Figure 5:
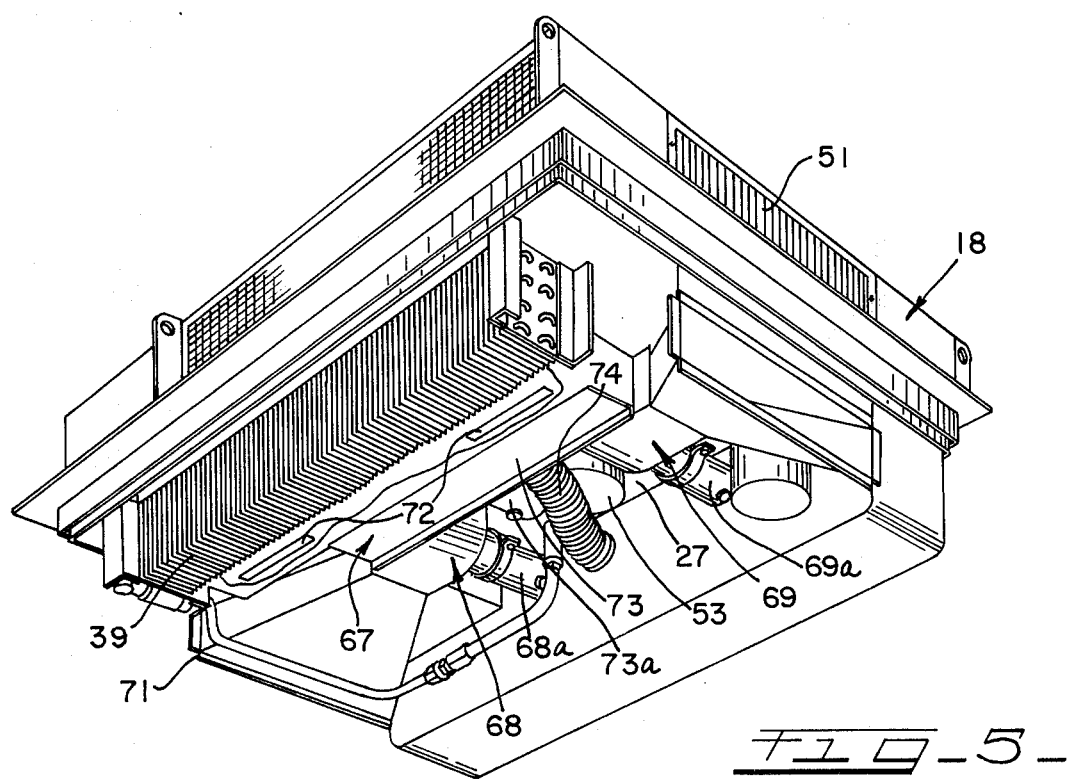
FIG. 5 is a bottom perspective view like FIG. 3 with the lower cover removed to show the underlying parts.

As seen in FIGS. 4 and 5, a panel 24 arranged along the frame 16 separates the upper cover from the lower cover and coacts with the covers to define an upper condenser compartment or chamber 25, an upper compressor compartment 26, and a lower evaporator compartment or chamber 27. Additionally, a partition 28 coacts with the upper cover and panel 26 for defining the upper compartments or chambers. It can be seen that the upper compartments are arranged in side-by-side relationship.

The refrigeration unit is diagrammatically illustrated in FIG. 8 and includes parallel connected condensers 32 and 33 connected at their inlet ends to a compressor 34 and at their outlet ends to a receiver 35. The outlet end of the receiver is connected to a combination filter drier 36 which in turn is connected to a sight glass 37. The outlet end of the sight glass connects to a thermostatic expansion valve 38 which is connected to an evaporator coil 39. The outlet end of the evaporator coil 39 is connected to the suction side of the compressor 34 through a suction throttling valve 40. A liquid bleed line 41 is connected between the suction throttling valve and the outlet side of the evaporator coil 39, while an equalizer line 42 is connected between the suction throttling valve and the thermostatic expansion valve. A thermostat bulb 43 which controls the expansion valve 38 is connected between the suction throttling valve 40 and the outlet side of the evaporator coil 39.

Accordingly, it can be appreciated that parallel connected condensers are utilized in the refrigeration unit and these condenser coils are mounted at the front and back sides of the condenser compartment 25, as seen in FIG. 6. Suitable inlet openings in the upper cover 18 are aligned with the condenser coils to communicate the coils which are arranged within the condenser compartment with the atmosphere outside the unit. It may be further appreciated that these condenser coils are extending in parallel relation along an axis that is perpendicular to the moving direction of the locomotive.

Within the condenser compartment 25, a condenser blower unit 48 is mounted for circulating air through the condenser coils within the condenser compartment and expelling the air partially to the atmosphere and partially to the compressor compartment 26. The condenser blower includes a housing 49 within which a fan 50 is rotatably mounted for drawing air from underneath the housing into the housing and expelling same through an air discharge opening 51 in a side wall of the upper cover 18 and for discharging air through a discharge opening 52 into the compressor compartment 26. The fan 50 is driven by a condenser blower motor 53 which extends at least partly within the evaporator compartment 27. It will be appreciated that ram air will also be induced through at least one of the condenser coils depending upon the direction of movement of the locomotive.

The compressor chamber 26 has mounted therein a compressor unit 57 which includes a compressor motor 58 of the variable speed induction type and a compressor 59. By virtue of the air flow through the compressor chamber, a cooling of the compressor unit is achieved. Accordingly, condenser air expelled from the condenser chamber washes across the compressor unit and is expelled through a discharge opening 60 formed along one side of the upper cover 18. It can be appreciated that the air flow through the upper condenser compartment and the upper compressor compartment therefore is directed to discharge to the opposite sides of the air conditioning unit. It may further be appreciated that the upper cover 18 is sectional and includes a section 18a overlying the condenser compartment and a section 18b overlying the compressor compartment, the latter of which is hinged to the former so that it can be opened independent of the section 18a for selective access to the compressor unit for maintenance purposes.

The lower section of the air conditioning unit includes twin blowers drawing air across the evaporator coil and across the heating elements and discharging the conditioned air into the cab, together with a defroster unit for specifically directing defrosting air to the windshields of the locomotive and/or to the other side windows. Further, the lower cover 19 includes suitable openings for the evaporator coil and the air discharge, together with a lower panel formation serving as a condensate tray or drip pan for collecting condensate coming off the evaporator coil and disposing of same. The specific purpose of the condensate tray is more clearly discussed in the above identified patent, which is also owned by the assignee of this application.

Accordingly, the evaporator coil 39 is provided in alignment with an opening 66 in the lower cover 19. A plenum housing 67 is positioned at the discharge side of the evaporator coil and interconnected with blowers 68 and 69. The opening 66 for the evaporator coil faces forward in the cab. The discharge of blower 68 aligns with an opening 70 in the lower cover 19, while the discharge of the blower 69 aligns with an opening 71 in the lower cover. Heating elements 72 are provided in the plenum housing 67 for providing heated air when the refrigerator cycle is off and the heating cycle is on for heating the air within the cab. A defroster blower 73 is interconnected with the plenum housing 67 and provided with connection to a discharge conduit 74 that exits from the rear of the lower cover at an outlet 75 which would be suitably connected to conduit feeding to the windshield of the locomotive. As seen particularly in FIG. 3, a condensate drain line may be connected to the condensate outlet 76 for disposing of the condensate collected in the condensate tray portion of the lower cover 19.

Referring now to the electrical schematic diagrams of FIGS. 9 and 10, it may be first appreciated the condenser motor 53 and the compressor motor 58 are electrically connected in parallel and driven from the same source of variable electrical voltage which comes from the generator of the locomotive. This electrical voltage will vary not only voltagewise but also frequencywise wherein the voltage may be in the range of 45 to 215 volts AC, while the frequency will be in the range of 30 to 120 Hertz. The heating elements, fan motors, and defroster motor are driven by a 74 volt DC source. Further, a motor start relay 80 having contactors 81 is operated from the 74 volt DC power for controlling the operation of the condenser and compressor motors.

A main switch 82 for operating the air conditioner unit, which includes switch portion 82a, is shown in the "cool position" for energizing the condenser and compressor motors following the energization of a time-delay relay 83 operating a contact 84.

Additionally, switch 82 includes switch portions 82b and 82c for controlling the operation of a first heating element portion 72a; switch portions 82d and 82e for controlling the operation of a second heating element portion 72b; switch portions 82f and 82g for controlling the operation of a third heating element portion 72c; and switch portions 82h and 82i for controlling the operation of a fourth heating element portion 72d. Accordingly, the main switch can be set to a cool position as shown or a heat position where any of the heating element portions can then be energized, it being understood none of the heating elements can be energized when the main switch is in cool position.

Further switch elements are provided for specifically controlling the operation of the heating elements. More specifically, a heating element switch 90 controls the operation of heating element portions 72a and 72b, while a heating element switch 91 controls the operation of heating element portions 72c and 72d. More specifically, heating element switch 90 includes switch portions 90a, 90b, 90c and 90d, all operating together for selectively energizing one of the heating element portions in "low heat position" as illustrated or both of the heating element portions in a "high heat position". Similarly, the heating element switch 91 includes switch portions 91a, 91b, 91c and 91d for selectively providing energization of one of the heating element portions 72c and 72d to be energized for a low heat position as shown or for both of the heating element portions to be energized in a high heat position.

Blowers 68 and 69 respectively include blower motors 68a and 69a, which can be individually controlled to be set on "low", "medium" or "high" positions. More specifically, fan or blower switch 93 which includes switch portions 93a and 93b controls the blower motor 68a, while fan or blower switch 94 having switch portions 94a and 94b controls the speed of the motor 69a.

The defroster unit 73 includes a motor 73a and heating element 73b which is controlled by a defrost switch 96 having switch portions 96a and 96b that are capable of turning the motor on in one position and turning on the heating element with the motor in another position and completely de-energizing both the motor and the heating element in a third position as shown. Accordingly, the defrost unit can be operated completely independently of operation of the cooling or heating cycles of the air conditioning unit or together with the heating and cooling cycles to provide the necessary defrosting action desired.

It can be further appreciated that the air conditioning unit may be operated in a cooling cycle with the blower motors at various speeds or at a heating cycle with the blower motors at various speeds. A suitable thermostat may be provided for operating thermostat contacts 98 in the main line circuit. Further, suitable overload switches or breakers are provided for the condenser and compressor motors together with the refrigeration cycle high and low pressure switches. Pilot lights are provided for use with the heating element portions to indicate which heating element portion is energized. Other suitable protective switches and/or pilot light devices may be provided as desired.

It will be understood that modifications and variations may be effected without departing from the scope of the novel concepts of the present invention, but it is understood that this application is to be limited only by the scope of the appended claims.

The invention is hereby claimed as follows:

1. An air conditioning system for a locomotive cab to be mounted in the roof of the locomotive cab, said system comprising a frame including a centrally and horizontally arranged panel, upper and lower covers on the top and bottom sides of the panel defining upper and lower chambers, the upper chamber being generally positioned above the roof and exposed to the atmosphere, the lower chamber being generally positioned below the roof and within the cab, said upper chamber being divided into first and second side-by-side compartments, a pair of spaced heat exchanger condensing units in said first compartment one at each of the front and back ends thereof and extending vertically and perpendicular to the longitudinal axis of and the path of movement of the locomotive, means connecting the condenser units in parallel, a compressor unit in said second compartment, air inlet openings in the upper cover at the front and back walls aligning with the condenser units, a first air discharge opening in a side wall of the upper cover for communicating said first compartment to the atmosphere and a second air discharge opening for said first compartment to connect same to said second compartment, a third air discharge opening in a side wall of the upper cover for communicating said second compartment to the atmosphere, whereby the compressor unit is cooled, a blower unit in said first compartment between the spaced condenser units arranged to draw air into said compartment through the condenser units and expel air through said air discharge openings, a heat exchanger evaporator unit in the lower chamber, an air inlet opening in the lower cover for the lower chamber aligned with said evaporator unit to allow air to move from the cab through the evaporator unit and into the lower chamber, air discharge opening means in the lower cover, and a blower in the lower chamber to draw air through the evaporator unit and expel it through the discharge opening means into the cab.

2. An air conditioning system for a locomotive cab to be mounted in the roof of the locomotive cab, said system comprising a frame including a centrally and horizontally arranged panel, upper and lower covers on the top and bottom sides of the panel defining upper and lower chambers, the upper chamber being generally positioned above the roof and exposed to the atmosphere, the lower chamber being generally positioned below the roof and within the cab, said upper chamber being divided into first and second side-by-side compartments, a pair of spaced heat exchanger condensing units in said first compartment one at each of the front and back ends thereof and extending vertically and perpendicular to the longitudinal axis of and the path of movement of the locomotive, means connecting the condenser units in parallel, a compressor unit in said second compartment, said compressor unit including a compressor and a AC variable speed motor for driving said compressor, air inlet openings in the upper cover at the front and back walls aligning with the condenser units, air discharge opening means in said upper cover, a blower unit in said first compartment between the spaced condenser units arranged to draw air into said compartment through the condenser units and expel air through said air discharge opening means, said blower unit including a fan and an AC variable speed motor for driving said fan, a heat exchanger evaporator unit in the lower chamber, an air inlet opening in the lower cover for the lower chamber aligned with said evaporator unit to allow air in the cab to move through the evaporator unit and into the lower chamber, air discharge opening means in the lower cover, a blower in the lower chamber to draw air through the evaporator unit and expel it through the discharge opening means into the cab, and a single source of AC power connected to said motors and variable in relation to the speed of the locomotive.

3. The system defined in claim 2, wherein said single source of AC power includes an alternator on the locomotive.

4. An air conditioning system for a heavy vehicle having a cab for the operator comprising, a condensing unit and compressor unit mounted on the upper side of the roof of the cab, said unit comprising a housing having opposed front and back walls extending perpendicular to the path of movement of the vehicle, opposed side walls and a top wall, air flow openings in the front, back and side walls, a pair of condensing coils within the housing one adjacent to and aligned with each of the front and back walls, means connecting said coils in parallel to split the cooling load therebetween.

a blower unit mounted between the coils drawing air into said casing through air flow openings and said coils and moving same out through air flow openings, said blower unit including a fan and an AC variable speed motor, a compressor unit within the housing having a compressor and an AC variable speed motor driving same, and a single source of AC power connected to said motors and variable in relation to the speed of the vehicle.

5. The combination as defined in claim 4, wherein said single source of AC power includes an alternator on the vehicle.

6. An air conditioning system for a locomotive cab to be mounted in the roof of the locomotive cab, said system comprising a housing arranged above the roof and defining side-by-side condenser and compressor compartments for respectively enclosing a condenser unit and a compressor unit, said compressor compartment having mounted therein a pair of parallel connected condensers arranged in spaced relation at the front and back sides of the compartment, air inlet openings in the housing at the front and back sides thereof aligning with the condensers, a first air discharge opening in the housing at one side thereof for communicating the condenser compartment to the atmosphere and a second air discharge opening for connecting the condenser compartment with the compressor compartment, a compressor unit mounted in the compressor compartment, a third air discharge opening in the housing for communicating the compressor compartment to the atmosphere, and a blower unit in the condenser compartment between the spaced condensers arranged to draw air into the condenser compartment through the condenser units and expel air through the compartments and the air discharge openings.

7. An air conditioning system as defined in claim 6, wherein said blower unit includes a variable speed induction motor driving a fan, said compressor unit including a variable speed induction motor driving a compressor and a single source of electrical power connected in parallel to said motors responding to the speed of the locomotive.

* * * * *